INVENTOR.
ALLAN I. POMS
BY John P. Taylor
Agent

United States Patent Office 3,462,339
Patented Aug. 19, 1969

3,462,339
FIRE-RETARDANT PANEL CONSTRUCTION
Allan I. Poms, Detroit, Mich., assignor to Koppers Company, Inc., a corporation of Delaware
Filed Mar. 15, 1966, Ser. No. 534,465
Int. Cl. B32b 3/02, 5/18, 21/04
U.S. Cl. 161—44                                       4 Claims

ABSTRACT OF THE DISCLOSURE

A sandwich panel is provided having a foamed polymeric core and a face of denser material such as wood or metal and having a thermal capacitance disposed between the face and the polymeric core. The thermal capacitance is a material capable of dehydrating upon exposure to heat, preferably calcium dihydrate (gypsum).

This invention relates to sandwich building panels.

Sandwich panels for use in construction of walls and the like have foamed polymeric cores faced by sheets of a denser material such as wood or metal.

Such panels unfortunately do not provide the fire-resistant characteristics of conventional building materials such as lath and plaster walls, etc., and therefore have not been acceptable to various regulatory authorities for use in building structures.

The principal objection to sandwich panels has been the danger that the foam polymeric core material will melt and burn. When the sandwich panel is subjected to a flame, the facings transfer heat to the polymeric core material; the temperature of the interface or joining of the polymer and denser facing material rises as the heat is transferred, eventually reaching such that the polymer melts and runs out any openings in the facings thereby providing further fuel for the flame.

It is, therefore, an object of this invention to provide a panel which will limit the rise in temperature at the interface of the polymer core and outer facing, thereby retarding or delaying the melting of the polymer for an acceptable period of time.

In accordance with this invention, a thermal capacitance is provided between the dense outer facing material and the polymeric core. More particularly, the capacitance is a material capable of dehydrating upon exposure to heat and in the preferred embodiment this material comprises a gypsum board.

The hydrated calcium sulfate material of the gypsum board, upon application of heat, loses water of hydration, and limits the temperature that heat can be passed onto the polymeric core. The gypsum passes first from the dihydrate form to the hemi-hydrate form and eventually becomes anhydrous calcium sulfate. In the losing of the waters of hydration, heat is absorbed and thus the surfaces immediately adjacent are cooled by the dehydration process. This feature enables the foam polymeric core structure to be cooled sufficiently to prevent melting of the core due to the transmission of the heat from the outer surface. Additionally, if the facing material be wood, the cooling, with respect to the outer facing, inhibits or retards the charring action thereon by the fire. Furthermore, since the gypsum layer does not shrink as much as does the wood layer, the joint where two adjacent panels abut does not separate at the abutting gypsum faces to expose the interior and so the heat does not penetrate beyond the protecting gypsum layer as would occur if only a wood facing were used.

The drawings and accompanying description will serve to illustrate the invention more clearly.

Figure 1:
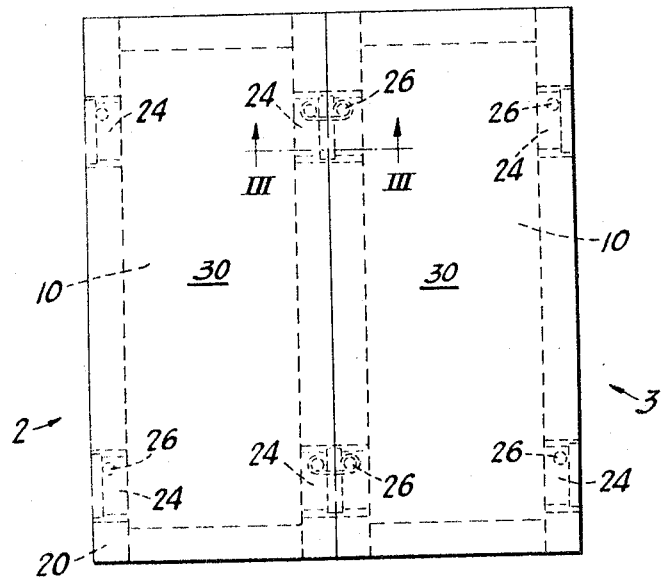
FIGURE 1 is a side view of an embodiment of the invention as two adjacent panels including the framework of each panel and the mechanisms for locking the panels together.

Referring now to FIGURE 1, the panels 2 and 3 each comprise a rectangular framework 20 which may be constructed of wooden beams or the like. These wooden beams or rails have preferably been treated with fire-retardant salts to render the wood non-combustible.

The framework 20 of each panel is provided with openings or recesses 24 which house locking mechanisms 26 to secure adjacent panels as is shown in FIGURE 1. These recesses or openings are necessary to provide a flush fit between adjacent panels, however they provide a communication between the interior of the panel and the joint which, without the practice of this invention, can have deleterious effects.

Figure 2:
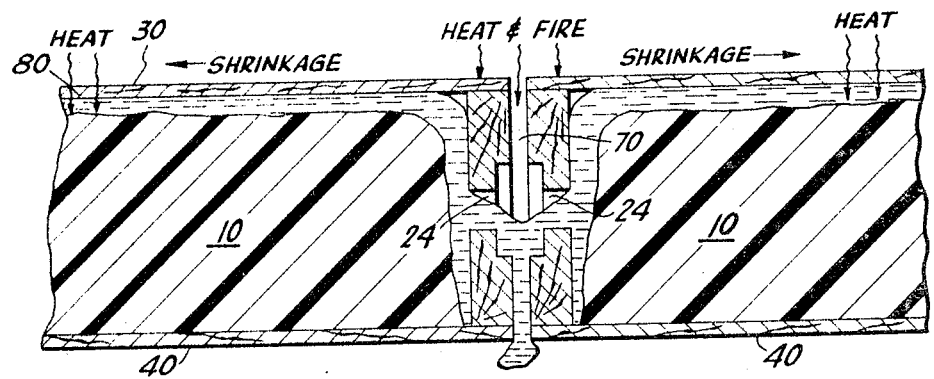
FIGURE 2 is a cross-sectional view of a prior art panel and illustrates the effect of heat and fire upon such a construction.
Figure 3:
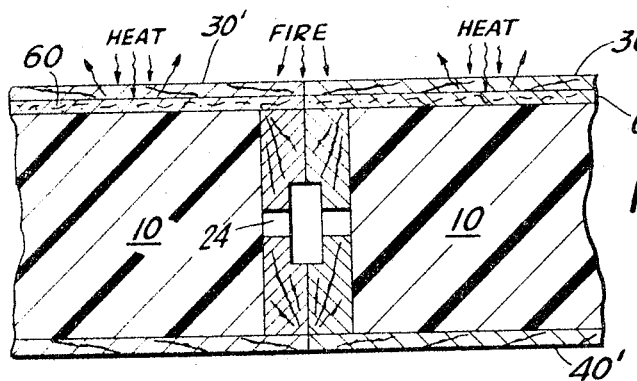
FIGURE 3 is a view along III—III of FIGURE 1 to illustrate the difference in structure and the difference in performance when exposed to heat and fire.

The interior of the panel, as best seen in FIGURES 2 and 3 comprises insulating core of foamed polymeric material 10. The foamed insulation material, may comprise any of a number of foamable polymeric materials such as polystyrene, copolymers of styrene, polymerized alphamethylstyrene, polyethylene, polyurethane or polyester resins. These materials may be foamed in place utilizing, for example, the apparatus described in Patent No. 2,998,501.

The thickness of the foam insulating core may vary (as will the corresponding thickness of the wood framework) with the degree of insulation required. For example, the insulation of a foamed polystyrene core can be so great that a three-inch-thick core is sufficient for maintenance of a 40° F. temperature on one side of the panel while the opposite side is exposed to a 90° F. ambient temperature.

Heretofore, panels have been made in the nature illustrated in FIGURE 2. The panel has, for example, a front facing sheet 30 and a rear facing sheet 40. Facing sheets 30 and 40 are conventionally made of a plywood material and one or both sheets preferably are constructed of a plywood which has been treated with mineral salts to render it fire retardant similar to rail 20. However, as shown in FIGURE 2, the facing member 30 of conventional core device panels, when exposed to excessive heat due to flame, may shrink as indicated by the arrow exposing the joint between two adjacent panels. The flame may then enter the joint 70, exposing the foam core to the flame and heat through the openings 24. The molten polymer then flows out openings 24 into the joints and is consumed by the fire providing more fuel and negating the effect of treating the rails 20 which materials to render them fire retardant.

Although the treated rails do not provide fuel for the fire, the molten plastic material flowing through the openings 24 in the rails do provide such fuel. The openings are necessary as previously mentioned to house the locking mechanisms needed to fasten adjacent panels together.

In addition to the fire entering the joints of FIGURE 2 due to the shrinkage of the wood face 30, face 30 may transmit enough heat as indicated at 80 to begin to melt the polymer at the interface adjacent the wall exposed to the heat and fire. The wall 30 is being exposed to heat at 80 and the heat is penetrating through the plywood wall 30 melting the polymer adjacent the wall as well as the polymer which is melting due to the entrance of the fire at the joint. Although wood face 30 may be treated with mineral salts to render it fire retardant, it is still subject to a charring action upon prolonged exposure to flame. This charring might well eventually expose the entire foam core to the flame.

The panel of my invention as shown in FIGURE 3 remedies the defects of the panel of FIGURE 2, and the difference in effect can be readily noted. While an outer panel or facing member 30' there is provided behind such facing a thermal capacitance 60. The thermal capacitance 60 has the ability to absorb heat and thereby maintain an even temperature until the material is completely consumed or more properly chemically altered so that it no longer has the capacity to absorb heat. The particular material used is a gypsum material which has the chemical formula $CaCO_4 \cdot 2H_2O$ (calcium sulfate dihydrate), more commonly known in the construction industry as gypsum or wallboard. This gypsum layer 60 when exposed to excessive heat dehydrates but does not shrink appreciably. The lack of shrinking prevents the entrance of the fire at the joints as shown at 70 in FIGURE 2. Thus no material melts and flows into the joint because no fire is transmitted into the joint to heat and melt the foam. At the same time the gypsum prevents the heat from penetrating through the face of the panel into the foam. Any heat which does penetrate through layer 30' is absorbed by gypsum layer 60 as it dehydrates. This insures that the foamed material will not melt and run out of the panel to feed the fire for the amount of time otherwise necessary to bring a fire within control if no further fuel is added to the fire.

Although the opposite surface is not illustrated as of multilayer construction, side 40' may also be an outer wood facing member backed by a layer of wallboard if there is danger of exposure to fire from either side of the panel. Normally however only the fire side of the panel has the protective layer 60 of wallboard. For example when used as the outer wall or the roof of a building only the interior side has the gypsum layer 60. However, for an interior wall both sides of the panel may be so constructed.

The rail portion 20 may be of conventional 2 x 2 construction or may be of a thicker width depending upon the amount of insulation required for the application which in turn will depend on the temperature differential desired between the two faces of the panel. The rail 20 is usually constructed as a rectangular frame and the gypsum and plywood layers are fastened circumferentially to this outer rail in any suitable manner as by cement or nails.

Thus, it can be seen that my invention provides a lightweight insulated panel which can be readily installed yet has the fire retardant qualities necessary for acceptance in the construction industry as a suitable building material. The gypsum covers the entire face of the panel and, until the gypsum is destroyed or dehydrated, limits the temperature at which any heat is transmitted through it to portions of the panel such as the core which might be deleteriously affected by such heat transmission. The heat is not only kept away from the foam surface by the insulating properties of the gypsum but in addition the dehydration effect of the gypsum acts to cool the adjacent surfaces thus inhibiting the otherwise noted heat effects which tend to shrink the wood faces and joints, melt the foam core, and cause the molten plastic to ooze out of the panel.

I claim:
1. A fire-resistant insulating building panel comprising:
   a surface layer of fire-resistant wood,
   a thermal capacitance that comprises a layer of hydrated non-combustible material capable of dehydrating upon exposure to heat bonded to and coextensive with the surface layer,
   an insulating core layer of a foamed polymeric material bonded to the thermal capacitance, and
   a rectangular frame of fire-resistant wood circumferentially surrounding the lateral edges of said core positioned beneath the surface layer and the capacitance layer and bonded to said thermal capacitance layer.
2. The panel of claim 1 wherein said thermal capacitance is comprised or gypsum.
3. The panel of claim 1 wherein said foamed polymeric material comprises foamed polystyrene.
4. In a fire-resistant insulating building panel having a facing of a fire-retardant material bonded to a surface of the polymeric core with fire-retardant rectangular frame circumferentially surrounding the lateral edges of the core and positioned beneath the facing wherein the improvement comprises:
   a thermal capacitance disposed coextensively with the facing and positioned between the facing and the polymeric core for limiting the temperature at which heat is transferred through the facing to the core;
   said panel being placeable adjacent to a like panel with the frames of each being contiguous and being capable of engaging one another to form a joint;
   said thermal capacitance additionally disposed between the facing and the frame for preventing the entrance of fire at the joint of adjacent panels to form a continuous layer of thermal capacitance when adjacent panels engage each other.

References Cited
UNITED STATES PATENTS

| | | | |
|---|---|---|---|
| 3,196,494 | 7/1965 | Hartman et al. | 161—44 |
| 3,364,097 | 1/1968 | Dunnington | 161—403 X |

FOREIGN PATENTS

| | | |
|---|---|---|
| 664,484 | 6/1963 | Canada. |

ROBERT F. BURNETT, Primary Examiner

RAYMOND O. LINKER, Jr., Assistant Examiner

U.S. Cl. X.R.

52—232; 161—161, 403